United States Patent
Anderson et al.

(10) Patent No.: US 6,500,486 B1
(45) Date of Patent: Dec. 31, 2002

(54) CONTROLLED TINTABILITY ON MAR-RESISTANT COATINGS

(76) Inventors: Elaine M. Anderson, 12215 Buchanan Ct. Northeast, Blaine, MN (US) 55449; Martin L. Hage, 10231 Yorktown La., Maple Grove, MN (US) 55369; Frank J. Hughes, 7240 York Ave. South, Apt. 205, Edina, MN (US) 55435; Luben G. Koev, 12259 194 Ave., Elk River, MN (US) 55330

( * ) Notice: Subject to any disclaimer, the term of this patent is extended or adjusted under 35 U.S.C. 154(b) by 5 days.

(21) Appl. No.: 09/599,671

(22) Filed: Jun. 22, 2000

(51) Int. Cl.7 .................................................. B05D 3/00
(52) U.S. Cl. ........................ 427/164; 427/386; 427/387; 106/287.11
(58) Field of Search ..................... 106/287.11; 427/164, 427/386, 387

(56) References Cited

U.S. PATENT DOCUMENTS

| 3,166,527 A | * | 1/1965 | Ender ........................ 260/33.2 |
| 3,837,876 A | | 9/1974 | Mayuzumi et al. ... 106/287 SB |
| 3,961,977 A | | 6/1976 | Koda et al. ........... 106/287 SB |
| 4,378,250 A | | 3/1983 | Treadway et al. ..... 106/287.11 |
| 5,786,032 A | | 7/1998 | Hughes ....................... 427/387 |
| 6,057,040 A | | 5/2000 | Hage .......................... 428/447 |

* cited by examiner

Primary Examiner—Margaret G. Moore

(57) ABSTRACT

It is difficult to provide abrasion resistance coatings with both good coatability, optical clarity and the ability to be tinted after application of the coating to a transparent substrate, such as an ophthalmic lens. An abrasion-resistant coating that adheres well to the substrate and is clear, transparent, colorless, and free of visible specks comprises a solvent, an epoxy resin composition, an aminosilane, and an hydrocarbyltrihydrocarboxysilane, such as an alkyltrialkoxysilane. The aminosilane may be a partially hydrolyzed aminosilane that is effectively blocked from reacting with the epoxy resin composition at ambient temperature. The coating composition is applied to the substrate and then treated to remove any block from the hydrolyzable aminosilane such that the aminosilane and the epoxy resin composition react to form an abrasion-resistant coating. The coating is also controllably tintable and is strongly adherent to the substrate even after tinting or exposure to heat and humidity.

8 Claims, No Drawings

CONTROLLED TINTABILITY ON MAR-RESISTANT COATINGS

BACKGROUND OF THE INVENTION

1. Field of the Invention

The present invention relates generally to coating compositions, and more particularly, to polyorganosiloxane compositions forming mar-resistant coatings on substrates and to controlling the tintability of the mar-resistant coatings after formation on a substrate.

2. Background of the Art

A variety of substrates, including those made of glass, plastic, metal, or concrete, are usefully coated with protective films. It is generally desirable that protective film coatings have good weathering properties, strong adhesion to the substrate, as well as resistance to thermal shock, mechanical shock, heat, humidity, and common chemicals. It is also desirable that the protective film coatings be practical to apply, dry, and cure. These properties are more difficult to achieve when the protective film coating is applied to polymeric or plastic substrates than when applied to many other substrates because of the greater susceptibility of these synthetic substrates, especially where the need for mar resistance is highest.

Some plastic substrates are desirable substitutes for glass due to a lower density than glass, economically advantageous fabrications, and breakage resistance. However, commercially available plastic substrates tend to have a reduced resistance to surface damage such as abrasion, marring, and scratching when compared to glass. Therefore, protective film coatings for plastic substrates are of particular interest to a wide range of industries where plastics are used.

Several technical approaches have been attempted in an effort to coat plastic substrates to improve resistance to abrasion, marring and scratching of the plastic substrates. Among the various classes of materials used to provide protection to polymeric substrates have been polysiloxanes, epoxy resins, acrylic (both acryloyl and methacryloyl) resins, urethanes, titanate esters, and ambifunctional polymeric compositions with multiple classes of polymer functionalities (e.g., acryloylsilanes, epoxysilanes, etc.). In particular, substantial work has been carried out to develop coatings of polyorganosiloxanes cross-linked by a condensation of silane or silanol groups.

U.S. Pat. No. 3,837,876 (Mayasumi et al.) describes a reaction of an aminosilane with an epoxysilane to produce a substance dissolvable in a solvent. Once dissolved, the substance was applied to various substrates to coat the substrates and form a mar-resistant coating on the surface.

U.S. Pat. No. 3,166,527 (Ender) describes mixing an epoxysilane with an aminosilane to make an unpolymerized mixture and a polymerized mixture. Each of the mixtures was applied to a surface to coat the surface. The coating made by each mixture was cured either by standing at ambient temperature or by heating.

U.S. Pat. No. 3,961,977 (Koda) describes a use of an aminoalkoxysilane hydrolyzed within a range of 10 to 40% of hydroxyl groups and an epoxyalkoxysilane to make a coating mixture. The hydrolyzed aminoalkoxysilane and epoxyalkoxysilane were dissolved in a solvent. Solvents described included a ketone.

U.S. Pat. No. 4,378,250 (Treadway) describes the use of ketones or aldehydes in making a mar-resistant coating. In particular, Treadway describes hydrolyzing at least two different silane materials to above 40% hydrolysis to form a reaction mixture. Treadway also describes adding the ketone to the reaction mixture to form a ketimine. The reaction mixture is then applied to a substrate and cured.

U.S. Pat. No. 5,786,032 describes a process for manufacturing an abrasion-resistant coating that adheres well to the substrate and is clear, transparent, colorless, and free of visible specs. The coating is also highly tintable and is strongly adherent to the substrate even after tinting or exposure to heat and humidity. The process comprises partially hydrolyzing an aminosilane having hydrolyzable groups to form an aminosilane hydrolyzate; adding a non-silane epoxy prepolymer to the aminosilane hydrolyzate to form a first mixture; partially polymerizing the first mixture to form a second mixture; adding a solvent to the second mixture to form a third mixture; applying the third mixture to a substrate and curing the third mixture on the substrate to make the tintable and abrasion resistant coating. The first mixture may consist essentially of the aminosilane hydrolyzate and the non-silane epoxy prepolymer. Although this composition provided a unique capability of mar-resistance and tintability after formation, the coating tended to be too tintable with certain materials, making application of a full range of colors to a single lens type more difficult.

SUMMARY OF THE INVENTION

The present invention comprises an abrasion-resistant coating that adheres well to the substrate and is clear, transparent, colorless, and free of visible specs. The coating is also controllably tintable and is strongly adherent to the substrate even after tinting or exposure to heat and humidity. The coating composition includes a solvent, an epoxy resin composition, an aminosilane, and an hydrocarbyltrihydrocarboxysilane, such as an alkyltrialkoxysilane. The aminosilane may be a partially hydrolyzed aminosilane that is effectively blocked from reacting with the epoxy resin composition at ambient temperature. The coating composition is applied to the substrate and then treated to remove any block from the hydrolyzable aminosilane such that the aminosilane and the epoxy resin composition react to form an abrasion-resistant coating.

DETAILED DESCRIPTION OF THE INVENTION

It is not easy to modify only a single significant property of a film without adverse modification of other properties of films. This is particularly true where some significant properties of the film are related by the underlying nature of the properties or the components of the film that contribute to these properties. This is particularly the case when dealing with a film such as an abrasion resistant mar-resistant coating where many of the properties are tied to the structure of the polymeric network. For example, both chemical resistance and mar resistance are in part tied to the tightness and surface organization of the polymer chains. To whatever degree that tightness and organization is altered to modify one property, the other property is likely to be affected. There is also no assurance that one property can be adjusted within the desired range while maintaining one or a myriad of properties that are necessary for a specific type of commercial product. Such is the case where the high quality, tintable mar-resistant coating of the prior art represented by U.S. Pat. No. 5,786,032 was found to have too rapid a rate of absorption of dye from tinting solutions. Even having discovered this limitation on the use of that composition, there was no assurance that any chemical modification of the composition could have been predicted to provide reduced tintability, maintain an acceptable level of abrasion resistance, and maintain the high level of optical quality and other attributes essential across a wide range of properties that are necessary in a composition to be used as a coating on an ophthalmic lens.

The present invention includes a coating composition that includes a solvent, an epoxy resin that undergoes epoxy polymerization, and an aminosilane in combination with 2 to 60% by weight of a hydrocarbyltrihydrocarbyloxysilane. A particularly desirable coating composition utilizes a partially hydrolyzed aminosilane that is effectively blocked from reacting with the epoxy resin at ambient temperature to provide an exceptionally durable coating that is cross-linked by silanol condensation in combination with the hydrocarboxytrihydrocarbyloxysilane. The present invention also includes a method for making a coating cross-linked by silanol condensation that includes partially hydrolyzing an aminosilane to a degree that is greater than 10% of complete molar reaction, mixing the partially hydrolyzed aminosilane with an agent blocking epoxy polymerization such as a ketone or an aldehyde to form a ketimine thereby blocking later epoxy polymerization until desired by heating, adding an epoxy resin (including either or both of a non-silane epoxy resin or epoxysilane resin) to the ketimine along with the hydrocarbyltrialkoxysilane to form a mixture, partially polymerizing and/or further hydrolyzing the mixture by heating to provide body to the mixture, adding a solvent to provide to the polymerized mixture a proper viscosity for coating (and during this step or after this step or earlier adding the hydrocarbyltrialkoxysilane), and adding a surfactant to provide uniform coating characteristics. The composition is then coated and dried and/or cured on a substrate such as an ophthalmic lens.

Suitable non-silane epoxy resins include any compound containing a glycidyl or 3,4-epoxycyclohexyl, 3,4-epoxycyclopentyl group thereon (the latter often referred to as epoxycyclohexyl or epoxycyclopentyl groups), but which are free of reactive silane groups. These epoxy groups are represented by the formulae:

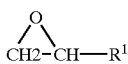

and
R$^1$-CH-CH-R$^2$
O where R$^1$ and R$^2$ include hydrogen, alkyl, aryl, alkoxy, alkoxyalkyl, alkoxyaryl, or other relatively stable organic moieties. Diepoxy, triepoxy, or polyepoxy compounds with the epoxies separated by alkyl, etheric, or alkyletheric linkages may also be used. This class of compounds is well known in the polymer art. The term epoxy resin is conventionally used to refer to any composition having compounds with polymerizable epoxy groups (e.g., glycidyl or 3,4-epoxycyclohexyl or 3,4-epoxycyclopentyl groups). These compounds may be monomeric compounds, oligomeric compounds or polymeric compounds as long as they have a polymerizable epoxy group (or functionality therein). In fact, the term epoxy resin is most conventionally used to refer to compositions comprising monomeric epoxy functional compounds.

The epoxy functional silanes usually excluded from the practice of the invention of U.S. Pat. No. 5,786,032, but which may be included as minor component (less than 50% by weight contribution to the final polymer solids, less than 30%, less than 20%, less than 10%, less than 5%, and less than 1%, including 0% by weight contribution to the final polymer solids) supplemental comonomers may be described by the formula:

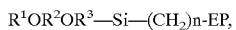

wherein R$^1$O, R$^2$O, and R$^3$O are independently selected from aliphatic groups or aromatic groups which complete a silane on the Si (silicon) atom, preferably alkyl groups or phenyl groups, and more preferably unsubstituted alkyl groups, n is as described above, and EP represents a glycidyl (e.g., glycidoxy) or cyclohexaneoxide (epoxycyclohexyl) or cyclopentaneoxide (epoxycyclopentyl) epoxy polymerizable group.

It is well recognized within the art that some substitution of the compounds used in forming the compositions is not only tolerable, but in some instances highly desirable.

Where the term group is used to refer to a substitutent or nucleus, that term is specifically inclusive of both substituted and unsubstituted substituents or nuclei. For example, the term alkyl group refers to not only the pure hydrocarbon within the definition of alkyl (e.g., methyl ethyl, octyl, isooctyl, dodecyl, etc.), but also those materials within the art recognized as substituted alkyls, such as monosubstituted haloalkyl, hydroxyalkyl, ether groups (e.g., —CH$_2$—O—CH$_2$—, etc.), and the like. Where the chemical group is used without description of a group or described as a moiety, such as with ethyl or hexyl moiety, or decyl, that phrase excludes substitution.

AMINOALKYLALKOXYSILANE PRECURSORS

A great number of aminoalkylalkoxysilane precursors are known and suitable for conversion to the alkine-bridged bis-(aminosilane) for use in the present invention. Many suitable aminoalkylalkoxysilane precursors may be represented by the structure of below:

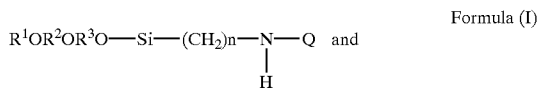

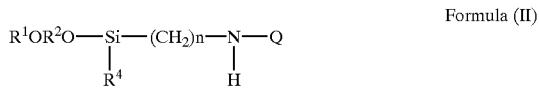

wherein R$^1$O, R$^2$O, R$^3$O and n are as defined above, R$^1$, R$^2$, and R$^3$ are independently monovalent hydrocarbon radical (e.g., alkyl and other aliphatic radicals, especially alkyl groups and most particularly methyl and ethyl), Q is a hydrogen or other halide reactive group, or halide non-reactive group (e.g., alkyl or aryl), and R$^4$ is selected from hydrogen, aliphatic and phenyl groups, alkyl of from 1 to 20 carbon atoms or especially alkyl groups of from 1 to 4 carbon atoms. Were the group R$^4$ an alkoxy group, the compounds of Formula (II) would be within the scope of Formula (I). For example, many known and suitable aminoalkyltrialkoxysilanes useful as precursors for the first component are as follows:

beta-aminoethyltriethoxysilane, beta-aminoethyltrimethoxysilane, beta-aminoethyltriethoxysilane, beta-aminoethyltributoxysilane, beta-aminoethyltripropoxysilane, alphaaminoethyltrimethoxysilane, alpha-aminoethyltriethoxysilane, gamma-aminopropyltrimethoxysilane, gamma-aminopropyltriethoxysilane, gamma-aminopropyltributoxysilane, gamma-aminopropyltripropoxysilane, beta-aminopropyltrimethoxysilane, beta-aminopropyltriethoxysilane, beta-aminopropyltripropoxysilane, beta-aminopropyltributoxysilane, alpha-aminopropyltrimethoxysilane, alpha-aminopropyltriethoxysilane, alpha-aminopropyltributoxysilane, alpha-aminopropyltripropoxysilane, N-aminomethylaminoethyltrimethoxysilane, N-aminomethylaminomethyltripropoxysilane, N-aminomethyl-beta-aminoethyltrimethoxysilane, N-aminomethyl-beta-aminoethyltriethoxysilane, N-aminoethyl-beta-aminoethyltripropoxysilane, N-aminomethyl-gamma-aminopropyltrimethoxysilane, N-aminomethyl-gamma-aminopropyltriethoxysilane, N-aminomethyl-gamma-aminopropyltripropoxysilane, N-aminomethyl-beta-aminopropyltrimethoxysilane, N-aminomethyl-beta-aminopropyltriethoxysilane, N-aminomethyl-beta-aminopropyltripropoxysilane, N-aminopropyltripropoxysilane, N-aminopropyltrimethoxysilane, N-(beta-aminoethyl)-beta-aminoethyltrimethoxysilane, N-(beta-aminoethyl)-beta-aminoethyltriethoxysilane, N-(beta-aminoethyl)-beta-aminoethyltripropoxysilane, N-(beta-aminoethyl)-beta-aminoethyltrimethoxysilane, N-(beta-aminoethyl)-alpha-aminoethyltriethoxysilane, N-(beta-aminoethyl)-alpha-aminoethyltripropoxysilane, N-(beta-aminoethyl)-beta-aminopropyltrimethoxysilane, N-(beta-aminoethyl)-gamma-aminopropyltriethoxysilane, N-(beta-aminoethyl)-gamma-aminopropyltripropoxysilane, N-(beta-aminoethyl)-gamma-aminopropyltrimethoxysilane, N-(beta-aminoethyl)-beta-aminopropyltriethoxysilane, N-(beta-aminoethyl)-beta-aminopropyltripropoxysilane, N-(gamma-aminopropyl)-beta-aminoethyltrimethoxysilane, N-(gamma-aminopropyl)-beta-aminoethyltriethoxysilane, N-(gamma-aminopropyl)-beta-aminoethyltripropoxysilane, N-methylaminopropyltrimethoxysilane, beta-aminopropylmethyldiethoxysilane, gamma-diethylenetriaminopropyltriethoxysilane. The N-beta and N-gamma alternatives are less preferred materials within the class of materials useful in the practice of the present invention.

Coatings may also be formed where the aminosilane is a hydrolyzed (which includes partial hydrolysis) product of a compound of one of the formulae:

[R¹OR²OR³O—Si—(CH₂)n-NR²⁰]ₚ—(CH₄₋ₚ)q(CH₂)m(CH₃)o,

[R¹OR²OR³O—Si—(CH₂)n-NR²⁰]₂—(CH₂)m

[R¹OR²OR³O—Si—(CH₂)n-NH]ₚ—(CH₄₋ₚ)q(CH₂)m(CH₃)o,

[R¹OR²OR³O—Si—(CH₂)n-NH]₂—(CH₂)m or

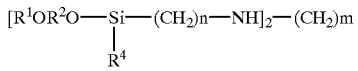

wherein $R^1$, $R^2$, and $R^3$ are independently selected from alkyl groups of 1 to 4 carbon atoms or phenyl groups, $R^4$ is selected from hydrogen, phenyl groups, and alkyl of from 1 to 4 carbon atoms, $R^{20}$ is defined as hydrogen, alkyl of from 1 to 4 carbon atoms, or phenyl, and n is 1, 2, 3 or 4, p is 2, 3 or 4, q is 0 or 1, o is 0 or 1, and m is 1, 2, 3 or 4, wherein q plus m is 1 or 2, o is 1 only when all aminosilane groups are bonded to the other alkine groups, and when p is 4, both m and o are zero.

Suitable aminosilanes also include compounds having the general formula:

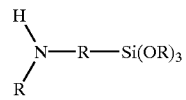

where each R is independently selected from aliphatic or aromatic groups, especially aliphatic or aromatic hydrocarbon groups, such that the aminosilane can be any stable mix of substituents or combination of substituents at the various positions within the aminosilane of alkyl groups, alkoxy groups, alkyl ether groups, alkylamino groups or other combination of carbon, hydrogen and hetero atoms. One particularly preferred component, due to availability and price, is gamma-aminopropyltriethoxysilane.

HYDROCARBYLTRIHYDROCARBYLOXYSILANES

The additional novel component of the present invention is a hydrocarbyltrihydrocarbyloxysilane, including alkyltrihydrocarbyloxysilane, phenyltrihydrocarbyloxysilane, alkyltrialkoxysilane, and phenyltrialkoxysilane. The term hydrocarbyl represents any moiety bonded to another atom directly through a carbon atom, and the term hydrocarbyloxy represents any moiety bonded to another atom through the oxygen of a —C—O— group. Many suitable hydrocarbyltrihydrocarbyloxysilanes may be represented by the general formula below:

wherein $R^{11}O$, $R^{12}O$, and $R^3O$ are independently selected from aliphatic groups or aromatic groups which complete a silane on the Si (silicon) atom, wherein $R^{11}$, $R^{12}$, and $R^{13}$ preferably represent alkyl groups (of 1 to 8 carbon atoms, 1 to 4 carbon atoms, or 1 to 2 carbon atoms) or phenyl groups, and more preferably unsubstituted alkyl groups of the described chain lengths,

PARTIAL HYDROLYZATES

The aminoalkylalkoxysilane precursor (and if present, the epoxyalkylalkoxysilane precursor) may be preferably partially hydrolyzed in forming compositions of the present invention. The hydrolyzates may actually be in a gel form rather than easily flowing liquid, depending upon the degree of hydrolysis.

Hydrolysis refers to the initial products of reaction of water with alkoxy groups of the aminoalkylalkoxysilane precursor and/or of the epoxyalkylalkoxysilane precursor. Silanols are relatively unstable and tend to condense spontaneously. Thus, the simultaneous hydrolysis of a mixture of different silanes is normally referred to as co-hydrolysis, and a hydrolyzate refers to the end product of hydrolysis where some condensation has normally occurred during the hydrolysis reaction, so that homopolymers or copolymers are formed.

The reagent or precursor compounds of the aminosilanes used in the practice of the present invention include at least two, and usually three, alkoxy groups covalently bonded to a silicon atom. Each of these reagents may be partially hydrolyzed to form the partial hydrolyzate thereof by adding enough water to hydrolyze greater than 10% or 20% by number of the two or three available alkoxy groups, and more preferably having enough water to hydrolyze more than about 40% of these alkoxy groups.

Partial hydrolysis of the aminoalkylalkoxysilane precursor may be performed by adding enough water to hydrolyze an amount of the available alkoxy groups, and an approximately equal amount of a water soluble alcohol, such as ethanol or methanol, may be added to aid solubility. The mixture may be equilibrated, or ripened, for a sufficient period of time to effect the partial hydrolysis. The partial hydrolysis may be performed either by stripping off volatiles, such as the volatile alcohol by product of the hydrolysis, or not.

As a basic background to the practice of the present invention, the following underlying reactions and processes are believed to occur. The aminosilane reagent, herein described as Silane-N-$H_2$ for simplicity, is reacted with a halogen substituted alkane, e.g., dichloromethane, trichloromethane, dibromomethane, tribromomethane, 1,2-dichloroethane, 1,2-dichloro-1,2-dibromoethene, etc. Iodo counterparts of these compounds (with 100% iodine substituents or partial iodine substitution) are also useful within the practice of the present invention. Dichloromethane will be used in the schematic to exemplify the reaction without limiting then scope of the invention. In reacting the Silane-$NH_2$ with the halogenated alkane, the following reaction occurs:

Silane-N—$H_2$+$Cl_2CH_2$=Silane-NH—$CH_2$—NH-Silane+2HCl

This reaction generates a new reactant that can provide a higher crosslink density than the original aminosilane. It is desirable to keep the alkine or alkylene bridging group as small as possible (e.g., methine is most preferred and ethylene is next preferred).

The underlying method of use of the compositions and materials of the present invention may be summarized as follows. At least one aminosilane (10 to 60% by weight reactive ingredients within the solution), at least one epoxy resin (10 to 60% by weight total reactive ingredients within the solution) and at least one hydrocarbyltrihydrocarbyloxysilane (in an amount of from 2 to 60% by total reactive ingredients within the solution) are mixed into a coating composition and applied to a substrate. The hydrolyzable ingredients (e.g., any component comprising a silane group) may be hydrolyzed at any stage during the process (e.g., before admixture with any other ingredients, after admixture with one ingredient, or after admixture of all ingredients). It is desirable to be able to control the hydrolysis reaction for individual ingredients, so one skilled in the art would be most likely to choose a process where the individual hydrolyzable components are separately hydrolyzed before admixture with other ingredients. For an example of a particularly desirable description of a generally applicable process, an aminosilane is hydrolyzed, as described above. This is preferably performed with an alcohol, especially a lower molecular weight lower carbon chain length alcohol, such as 2-propanol. This can be done by combining the aminosilane and deionized water with stirring (e.g., at ambient temperature, although this may be varied up or down). These ingredients are allowed to react overnight or a shorter time if heated or catalyzed. The 2-propanol is then added and allowed to react for 3 hours with stirring (e.g., again at ambient temperature). The hydrocarbyltricarbyloxysilane is then mixed with deionized water with stirring (under ambient conditions) and allowed to react overnight. This step could be conveniently done at the same time as the hydrolysis of the aminosilane. The hydrolyzed aminosilane (with 2-propanol) and the epoxy compound, or epoxy compounds, are combined with stirring, heated to 95° F. to 158° F. (e.g., 122° F.), removed from heat, and held for enough time for the reaction to occur to a desirable level (e.g., 3.25 minutes). The temperature of the hot plate used to heat the mixture was 284° F. (140° C.). Immediately after the mixture reached a temperature of 122° F. (50° C.), the flask was removed from the hot plate and placed on a stirring plate at ambient temperature. The exotherm of the reaction caused the mixture to reach a temperature of 135° F. (57° C.). After two minutes, the hydrolyzed methyltrimethoxysilane was added. At the end of the 3.25 minutes, a quench was added comprising methyl ethyl ketone, ethanol, and Fluorad™ FC-430 fluorosurfactant. This was allowed to react for 5 minutes at ambient conditions before cooling to 50° F. (10° C.). Polycarbonate lenses were coated when this solution was cooled to 50° F. (10° C.), although sometimes the coating is stored at 14° F. (−10° C.) in a freezer before being warmed at ambient conditions to 50° F. (10° C.) and applied. The coated lenses are preferably precured for twenty minutes at 180° F. (82° C.) and then cured for 4 hours at 250° F. (121° C.).

The preferred coatings of this invention can last for as long as 14 days in a freezer environment at 14° F. (−10° C.) and still produce consistent results. The solution will remain viable for 48 hours at ambient temperature. By proper adjustment of ingredients as specifically shown in the following examples, the following range of properties may be easily achieved:

| | |
|---|---|
| Bayer Ratio | 3.3 to 3.6 |
| Post Tint TLT (tap water) | 9.0 to 18 after 10 minutes |
| Post Tint TLT (tap water) | 0.90 to 2.50 after 30 minutes |
| 30 Minutes Adhesion | Pass |
| Cyclic Humidity | Non-AR lenses fog, AR-lenses Pass |
| Thermal Shock | Pass |
| Coating Thickness | 4.1 micrometers |
| Yellowness Index D1925(2/C) | 0.64 |
| Initial Haze | 0.25 to 0.33 |

The coating composition of the present invention is formed by combining an aminosilane as described above (which as an option may also include the alkine-bridged bis-aminosilanes of U.S. Pat. No. 6,057,040 which may also be referred to as a bis-silane-amino-methide, the methide group including substituted methide, especially methyl methide or ethylene as the bridging group) with an epoxy resin. Longer chain bridging groups such as propyl or butyl can be made on the aminosilane, but these add a softness to the polymer coating which may not be desirable for mar resistant coatings. These optional longer chain alkine-bridged bis-aminosilanes may be good additives where some modest flexibility is desired without having to add a non-crosslinkable monomer which would add only to flexibility and could be more erratic in its effects as compared to the longer chain alkine bridged bis-aminosilane. If necessary or desired, a solvent may be provided to adjust the composition to the proper coating viscosity for the method of application. When the coating is applied to a substrate, it can be polymerized and hardened in an oven. The resulting coating is crosslinked by silanol condensation and by the alkylation of the aminosilane to provide an exceptionally durable coating perhaps due to the latter crosslinking reaction which would provide higher crosslink density (i.e., a lower crosslink equivalent weight) thereby resulting in better scratch resistance than would otherwise be possible. In addition, a range of tint values and shorter tinting times can be produced by suitable variations of the proportions of epoxy to aminosilane components. There are numerous classes of catalysts, which may also be used to improve the speed or manner of crosslinking and curing of the polymerizable groups. For example, perfluorinated alkylsulfonyl methides (and their amide counterparts) are known to be active catalysts for the silane condensation and for epoxy polymerization. Photoinitators such as the onium catalysts with complex fluorinated anions (e.g., triphenylsulfonium hexafluoroantimonate, diphenyliodonium tetrafluoroborate, phenylthiophenylsulfonium hexafluoroantimonate) are known photinitators for both the epoxy polymerization and the silane condensation reactions.

Copolymerizable monomers, oligomers, or polymers may also be present in the compositions of the present invention as well as fillers, adjuvants and conventional additives. For example, additional silane monomers, epoxy monomers or other crosslinkable materials may be present, such as titanate esters, acrylatesilanes (e.g., 3-acryloxypropyltrimethoxysilane, 3-methacryloxypropyltrimethoxysilane), and the like. Caution should be exercised in these options to assure that the crosslink density is not severely diminished, which would worsen hardness of the surface of the coating, or that other physical parameters are not adversely affected, as by the addition of softness or too great flexibility to the material composition of the coating. Additives to the compositions which would be particularly useful would include UV absorbers, such as benzophenones, as well as dyes, pigments, flow control agents, antistatic agents, surfactants, and the like.

The coating composition of the present invention is particularly suitable for coating plastic substrates such as transmissive sheets, windows, face guards, sports lenses, eye guards, and ophthalmic lenses. In particular, the coating composition provides an abrasion-resistant and mar-resistant coating for polycarbonate ophthalmic lenses.

The coating composition of the present invention is controllably tintable. The coating composition may be used to formulate a coating for a substrate such as an ophthalmic lens, which tints many times darker than coatings with compositions having two or more different silanes. It is surprising to note that the original disclosure of U.S. Pat. No. 5,786,032 stated that a "... presence of two different silanes is believed to render the composition of the coating ponderous. Also, the composition having two or more different silanes has a limited dye tintability range obtainable by varying the ratio of epoxy to amino groups within the bounds of allowable abrasion resistance." (Column 2, lines 43–53). The present invention actually has found that the addition of a specific class of silanes, e.g., hydrocarbyltrihydrocarbyloxysilanes, such as hydrocarbyltrialkoxysilanes, hydrocarbyltriphenoxyoxysilanes, alkyl- or phenyl-trialkoxysilanes, and alkyl- or phenyltriphenoxysilanes act to control the tintability of the finished coating while maintaining a satisfactory level of mar-resistance and maintaining the critical optical qualities essential for an ophthalmic element.

The method of the present invention is usable to provide a tintable coating for substrates such as ophthalmic lenses. In particular, the method may further include steps of coating a substrate with the coating composition and contacting the coating with a dye to impart a tint to the coating. The method has an increased versatility and efficiency for tinting lenses over methods presently available. A wide range of tint values and shorter tinting times with tinting baths may be produced by suitable variations of the proportions of epoxy and aminosilane components of the composition of the present invention.

Any suitable solvents may be used in the coating composition including, for example, alcohols, aldehydes, ketones, glycol ethers, and esters. One preferred solvent is a mixture of methyl ethyl ketone and ethanol. The particular step at which solvent is added in the method of making the composition is not critical.

In one embodiment, the composition preferably also includes a surfactant, used as a flow-controlling agent for regulating film thickness and enhancing the cosmetic appearance of the coated article. One commonly available fluorosurfactant is Fluorad™ FC-430, available from 3M of Saint Paul, Minn.

When the coating is applied to a substrate, the coating can be polymerized and hardened in an oven. Heat removes the blocking agent so that epoxy polymerization can take place.

The examples set forth below are intended for illustrative purposes and should not be construed as limiting the invention in any way.

COMPARATIVE EXAMPLE 1

1,000 grams of gamma-propylaminotriethoxysilane was added to 150 grams of water to form a mixture, which was heated to 95° F. (35° C.) and stirred for an hour. The temperature of the mixture reached approximately 176° F. (80° C.). The resultant solution was allowed to stand for at least two hours. This will be called Solution A.

A quantity of cyclohexanedimethylol diglycidyl ether was set aside and will be called Solution B.

A quantity of 100 grams of Fluorad™ FC-430 fluorosurfactant, manufactured by 3M of Saint Paul, Minn., were dissolved in 900 grams of methyl ethyl ketone, and labeled Solution C.

A quantity of 1,000 grams of solution A was added to 256 grams of solution B to form a mixture. The mixture was heated with stirring to 127° F. (53° C.) and components were allowed to react for 10 minutes. The reaction was then quenched with the addition of a mixture of 1,500 grams of methyl ethyl ketone, 64 grams of Solution C and 570 grams of ethanol. The quenched mixture was cooled down to 50° F. (10° C.). Polycarbonate lenses were dip coated with the cooled mixture, held at 150° F. (66° C.) for 20 minutes, and cured for 4 hours in an oven at 250° F. (121° C.).

Adhesion was tested by ASTM D3359. Abrasion was tested by 5 strokes of a steel wool mass weighted with a 32-ounce weight. If no scratches are observed, the coating passed. The lenses were tested for adhesion and abrasion.

The lenses displayed acceptable adhesion and abrasion. The lenses were dyed for five minutes in BPI Molecular Catalytic Black™, a dye from Brain Power, Inc., of Miami, Fla., and were found to have a total light transmission of 3%.

EXAMPLES OF THE INVENTION

Solution A in these examples comprises the same Solution A used in the comparative examples, and Solution B comprises the same Solution B used in the comparative examples.

Solution C was made by combining 74.07 parts by weight of the hydrolyzed aminosilane of Solution A and 11.11 parts by weight deionized water with stirring. These were allowed to react overnight. The following morning, 14.82 parts by weight 2-propanol was added and the solution was allowed to react for three hours with stirring.

Solution D was made from 73.57 parts by weight methyltrimethoxysilane and 26.43 parts by weight deionized water with stirring. The solution was allowed to react overnight.

The coating solution was prepared by combining ingredients in their desired proportions in the following manner. Solutions C and D were combined in amounts sufficient to provide the proportions shown in the Tables and Examples.

| Example | Molar Ratio | 5 Minute TLT | 10 Minute TLT | Bayer Ratio |
|---|---|---|---|---|
| CR-39™ | (not applicable) | 44.5 | 30.6 | 1.0 |
| 1 | 11.8:1.0 | 11.5 | 0.8 | 5.9 |
| 2 | 1.8:1.0 | 15.1 | 1.6 | 4.7 |
| 3 | 1.2:1.0 | 18.6 | 3.6 | 3.3 |
| 4 | 0.6:1.0 | 45.6 | 23.3 | 3.3 |
| 5 | 0.4:1.0 | 73.2 | 57.0 | 2.4 |
| 6 | 0.3:1.0 | 81.9 | 75.3 | 2.1 |

CR-39 is a registered trademark of PPG Industries, Pittsburgh, Pa.

The ability of the hydrocarbyltrihydrocarbyloxysilanes to provide the specific type and quality of properties with respect to retention of abrasion resistance, improved tintability and optical qualities was proven to be unique when numerous materials were attempted for use in the practice of the invention. To show this, the following list of unsuccessful attempts is shown:

| Chemical | Percentage | Effect |
|---|---|---|
| N-phenyl-3-aminopropyltriethoxysilane | 87.65% | Hazy |
| bis(trimethoxysilylpropyl)amine | 82.60% | Gelled |
| 3-chloropropyltrimethoxysilane | 10.00/20.00/60.00% | Poor Adhesion |
| tetramethoxysilane | 10.00/20.00/40.00% | Poor Adhesion |
| tetraethoxysilane | 20.00% | Crazing |
| tetramethoxysilane | 10.00/20.00/40.00% | Poor Adhesion |
| 3,3,3-trifluoropropyltrimethoxysilane | 1.00%/2.00% | Failed Cyclic Humidity |
| 1,4-butanedioldigylcidlyl ether | 4.13% | Yellow |
| neopentyl glycol diglycidyl ether | 4.18% | Yellow |
| titanium dioxide rutile grade powder | 15.54% | Gelled |
| 1,2-epoxy-3-phenoxypropane | 10.92%/7.56% | Hazy |
| glycidyl-2-methylphenyl ether | 10.92%/7.56% | Hazy |
| N,N-diglycidyl aniline | 7.56% | Hazy |
| resorcinol diglycidyl ether | 10.92%/7.56% | Hazy |
| methanol | 3.00%/6.00% | No Benefit |

The additions were done in a manner as follows. The hydrolyzed aminosilane with 2-propanol and the epoxy (in this case, cyclohexanedimethylol diglycidyl ether) are combined with stirring, heated to 122° F. (50° C.), and held for 3.25 minutes. This is done by immediately removing the solution from heat when a temperature of 122° F. (50° C.) has been reached. At the end of 3.25 minutes, the temperature reached 135° F. (57° C.). After two minutes, the hydrolyzed methyltrimethoxysilane was added. After 3.25 minutes, the quench, which contains methyl ethyl ketone, ethanol, and Fluorad™ FC-430 fluorosurfactant, is added. This mixture is allowed to mix at ambient conditions for about five minutes before cooling to 50° F. (10° C.). Lenses are coated with the composition when it has reached 50° F. (10° C.). The coated lenses are precured for 20 minutes at 180° F. (82° C.) and then cured for four hours at 250° F. (121° C.).

The following data result from a comparison of the composition of Example 3 from U.S. Pat. No. 5,786,032, with various amounts of the hydrolyzed methyltrimethoxysilane (as described above) added to the composition.

TINTED EXAMPLES OF THIS INVENTION

The molar ratio referred to in the following table of comparative examples is that of 3-aminopropyltriethoxysilane to methyltrimethoxysilane.

As can be seen from this list, a wide variety of compositions thought to be compatible with the mar-resistant compositions of U.S. Pat. No. 5,786,032 were evaluated unsuccessfully. The fact that only a single class of additives that were tried provided acceptable results establishes the uniqueness of the materials found in the practice of the present invention.

What is claimed:

1. A method for applying a mar resistant coating to a surface of an ophthalmic lens comprising the steps of:
   a) providing a first solution of at least one amino silane, at least one epoxy resin and at least one hydrocarbyltrihydrocarbyloxy silane and allowing the combination to react;
   b) applying the reacted combination onto said surface as a coating and allowing the coating to dry; and
   c) applying a tinting dye to the dried coating to tint the coating.

2. The method of claim 1 wherein the epoxy resin comprises a diglycidyl ether.

3. The method of claim 1 wherein said a hydrocarbyltrihydrocarbyloxysilane comprises an alkyltrialkoxysilane.

4. The method of claim 3 wherein said alkyltrialkoxysilane comprises a hydrolyzed alkyltrialkoxysilane.

5. The method of claim 1 wherein said aminosilane comprises a hydrolyzed aminosilane.

6. The method of claim 3 wherein said aminosilane comprises a hydrolyzed aminosilane.

7. The method of claim 4 wherein said aminosilane comprises a hydrolyzed aminosilane.

8. A method for applying a mar resistant coating to a surface of a polymeric ophthalmic lens comprising the steps of:
- c) providing a first solution of at least one amino silane and one additional ingredient selected from the group consisting of an epoxy resin and a hydrocarbyltrihydrocarbyloxy silane and hydrolyzing at least one ingredient of the first solution, thereby forming a second solution;
- d) adding to the second solution a hydrocarbyltrihydrocarbyloxy silane or an epoxy resin, thereby forming a third solution, and allowing ingredients among the third solution to react to form a fourth solution;
    - i. applying the fourth solution onto said surface of a polymeric ophthalmic lens as a coating and allowing the coating to dry; and
- e) applying a tinting dye to the dried coating to tint the coating.

* * * * *